(12) United States Patent
Narayanan et al.

(10) Patent No.: US 8,144,593 B2
(45) Date of Patent: Mar. 27, 2012

(54) METHOD AND APPARATUS FOR EFFICIENT ROUTING IN COMMUNICATION NETWORKS

(75) Inventors: Vidya Narayanan, San Diego, CA (US); Jun Wang, La Jolla, CA (US); Lakshminath Reddy Dondeti, San Diego, CA (US); Arungundram C. Mahendran, San Diego, CA (US); Raymond Tah-Sheng Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 662 days.

(21) Appl. No.: 11/941,792

(22) Filed: Nov. 16, 2007

(65) Prior Publication Data

US 2008/0181113 A1     Jul. 31, 2008

Related U.S. Application Data

(60) Provisional application No. 60/866,364, filed on Nov. 17, 2006.

(51) Int. Cl.
*H04J 1/16* (2006.01)
(52) U.S. Cl. ..................................... 370/236
(58) Field of Classification Search .............. 370/236, 370/349, 389, 352, 393, 392, 390, 401, 400, 370/402, 403, 285; 709/227, 230, 238, 239, 709/2
See application file for complete search history.

(56) References Cited

U.S. PATENT DOCUMENTS 7,162,544 B2 * 1/2007 Ohkawa et al. ............... 709/251
2006/0256762 A1 11/2006 Patel et al.

FOREIGN PATENT DOCUMENTS

| CA | 2357293 | * | 3/2000 |
|---|---|---|---|
| RU | 2272363 | | 3/2006 |
| RU | 2281617 C2 | | 8/2006 |
| WO | WO03/017586 A1 | | 2/2003 |
| WO | WO03/049405 A1 | | 6/2003 |
| WO | 2004010668 | | 1/2004 |

OTHER PUBLICATIONS

Vadali R et al: "Agent-based route optimization for mobile IP", IEEE Vehicular Technology Conference, Atlantic City, NJ, vol. 1 of 4, Conf. 54, Oct. 7, 2001, pp. 2731-2735.
International Search Report—PCT/US07/085079—International Search Authority, European Patent Office—May 8, 2008.
Written Opinion—PCT/US07/085079—International Search Authority, European Patent Office—May 8, 2008.

* cited by examiner

*Primary Examiner* — Chi Pham
*Assistant Examiner* — Alexander Boakye
(74) *Attorney, Agent, or Firm* — Nicholas A. Cole

(57) ABSTRACT

Methods and apparatus for efficient routing in communication networks. In an aspect, a method is provided for traffic routing between first and second nodes in a communication network. The method includes detecting traffic transmitted between the first and second nodes, transmitting a request to a mobility agent associated with the first node to request authorization for a route optimization between the first and second nodes, receiving a response that authorizes the route optimization, and establishing an optimized route. In an aspect, an apparatus includes detector logic for detecting traffic transmitted between the first and second nodes, transmitting logic for transmitting a request to a mobility agent associated with the first node to request authorization for a route optimization between the first and second nodes, receiving logic for receiving a response that authorizes the route optimization, and connection logic for establishing an optimized route.

58 Claims, 9 Drawing Sheets

METHOD AND APPARATUS FOR EFFICIENT ROUTING IN COMMUNICATION NETWORKS

CLAIM OF PRIORITY UNDER 35 U.S.C. §119

The present application for patent claims priority to Provisional Application No. 60/866,364 entitled "METHOD AND APPARATUS FOR ROUTE OPTIMIZATION IN WIRELESS NETWORKS" filed Nov. 17, 2006, and assigned to the assignee hereof and hereby expressly incorporated by reference herein.

BACKGROUND

1. Field

The present application relates generally to the operation of data networks, and more particularly, to methods and apparatus for efficient routing in Internet Protocol (IP) based networks.

2. Background

Typically, network mobility management protocols result in the flow of traffic via a central entity in the network. For example, the traffic between two mobile stations may be routed through one or more mobility agents. This may result in inefficient traffic flow between the two mobile stations because routing traffic through these centralized entities may introduce transmission latencies.

Currently, there is no route optimization capability in a network-based mobility management scenario. It is also important that any such route optimization in the case of network-based mobility not involve the mobile node. In fact, since mobility is handled by the network, the mobile node should remain unaware of the mobility.

Therefore, it would be desirable to have a system that operates to provide route optimization for efficient routing in IP networks so as to avoid transmission latencies associated with convention systems.

SUMMARY

In one or more aspects, a routing system is provided that comprises methods and apparatus that operate to provide route optimization to establish efficient routing between two nodes in a communication network.

In an aspect, a method is provided for traffic routing between first and second nodes in a communication network. The method comprises detecting traffic transmitted between the first and second nodes, transmitting a request to a mobility agent associated with the first node to request authorization for a route optimization between the first and second nodes, receiving a response that authorizes the route optimization, and establishing an optimized route.

In an aspect, an apparatus is provided for traffic routing between first and second nodes in a communication network. The apparatus comprises detector logic for detecting traffic transmitted between the first and second nodes, transmitting logic for transmitting a request to a mobility agent associated with the first node to request authorization for a route optimization between the first and second nodes, receiving logic for receiving a response that authorizes the route optimization, and connection logic for establishing an optimized route.

In an aspect, an apparatus is provided for traffic routing between first and second nodes in a communication network. The apparatus comprises means for detecting traffic transmitted between the first and second nodes, means for transmitting a request to a mobility agent associated with the first node to request authorization for a route optimization between the first and second nodes, means for receiving a response that authorizes the route optimization, and means for establishing an optimized route.

In an aspect, a computer program product is provided for traffic routing between first and second nodes in a communication network. The computer program product comprises a machine-readable medium embodying a first set of codes for causing a computer to detect traffic transmitted between the first and second nodes, a second set of codes for causing the computer to transmit a request to a mobility agent associated with the first node to request authorization for a route optimization between the first and second nodes, a third set of codes for causing the computer to receive a response that authorizes the route optimization, and a fourth set of codes for causing the computer to establish an optimized route.

In an aspect, at least one integrated circuit is provided that is configured for providing traffic routing between first and second nodes in a communication network. The at least one integrated circuit comprises a first module configured for detecting traffic transmitted between the first and second nodes, a second module configured for transmitting a request to a mobility agent associated with the first node to request authorization for a route optimization between the first and second nodes, a third module configured for receiving a response that authorizes the route optimization, and a fourth module configured for establishing an optimized route.

In an aspect, a method is provided for traffic routing between first and second nodes in a communication network. The method comprises receiving a request for a route optimization between the first and second nodes, wherein the request identifies a proxy agent, transmitting a response that identifies the first and the second nodes, and establishing an optimized route with the proxy agent.

In an aspect, an apparatus is provided for traffic routing between first and second nodes in a communication network. The apparatus comprises receiving logic configured to receive a request for a route optimization between the first and second nodes, wherein the request identifies a proxy agent, transmitting logic configured to transmit a response that identifies the first and the second nodes, and connection logic configured to establish an optimized route with the proxy agent.

In an aspect, an apparatus is provided for traffic routing between first and second nodes in a communication network. The apparatus comprises means for receiving a request for a route optimization between the first and second nodes, wherein the request identifies a proxy agent, means for transmitting a response that identifies the first and the second nodes, and means for establishing an optimized route with the proxy agent.

In an aspect, a computer program product is provided for traffic routing between first and second nodes in a communication network. The computer program product comprises a machine-readable medium embodying a first set of codes for causing a computer to receive a request for a route optimization between the first and second nodes, wherein the request identifies a proxy agent, a second set of codes for causing the computer to transmit a response that identifies the first and the second nodes, and a third set of codes for causing the computer to establish an optimized route with the proxy agent.

In an aspect, at least one integrated circuit is provided for traffic routing between first and second nodes in a communication network. The at least one integrated circuit comprises a first module for causing a computer to receive a request for a route optimization between the first and second nodes, wherein the request identifies a proxy agent, a second module for causing the computer to transmit a response that identifies the first and the second nodes, and a third module for causing the computer to establish an optimized route with the proxy agent.

In an aspect, a method is provided for traffic routing between first and second nodes in a communication network. The method comprises receiving a request for a route optimization between the first and second nodes, transmitting the request to a proxy agent associated with the second node, receiving a first response from the proxy agent associate with the second node, and transmitting a second response to a proxy agent associated with the first node.

In an aspect, a method is provided for traffic routing between first and second nodes in a communication network. The method comprises detecting traffic transmitted between the first and second nodes, transmitting a first request to a first proxy agent associated with the first node for a route optimization between the first and second nodes, transmitting a second request to a second proxy agent associated with the second node for the route optimization between the first and second nodes, and receiving a response from each proxy agent.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

In one or more aspects, a routing system is provided that operates to provide route optimization to establish efficient routing in an IP network. The system is well suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

Introduction

The routing system described below operates to provide efficient routing of traffic between nodes of a network. The system may be implemented as part of any suitable Network-based Local Mobility Management (NETLMM) Protocol. In various aspects, the system operates to set up an optimized route between Mobility Proxy Agents (MPAs) serving two corresponding mobile nodes, thereby allowing the traffic exchanged between the nodes to bypass a Local Mobility Agent (LMA), which is a centralized entity in the mobility management architecture. In various aspects, a mobile node (MN) may also referred to as a mobile station (MS).

Figure 1:
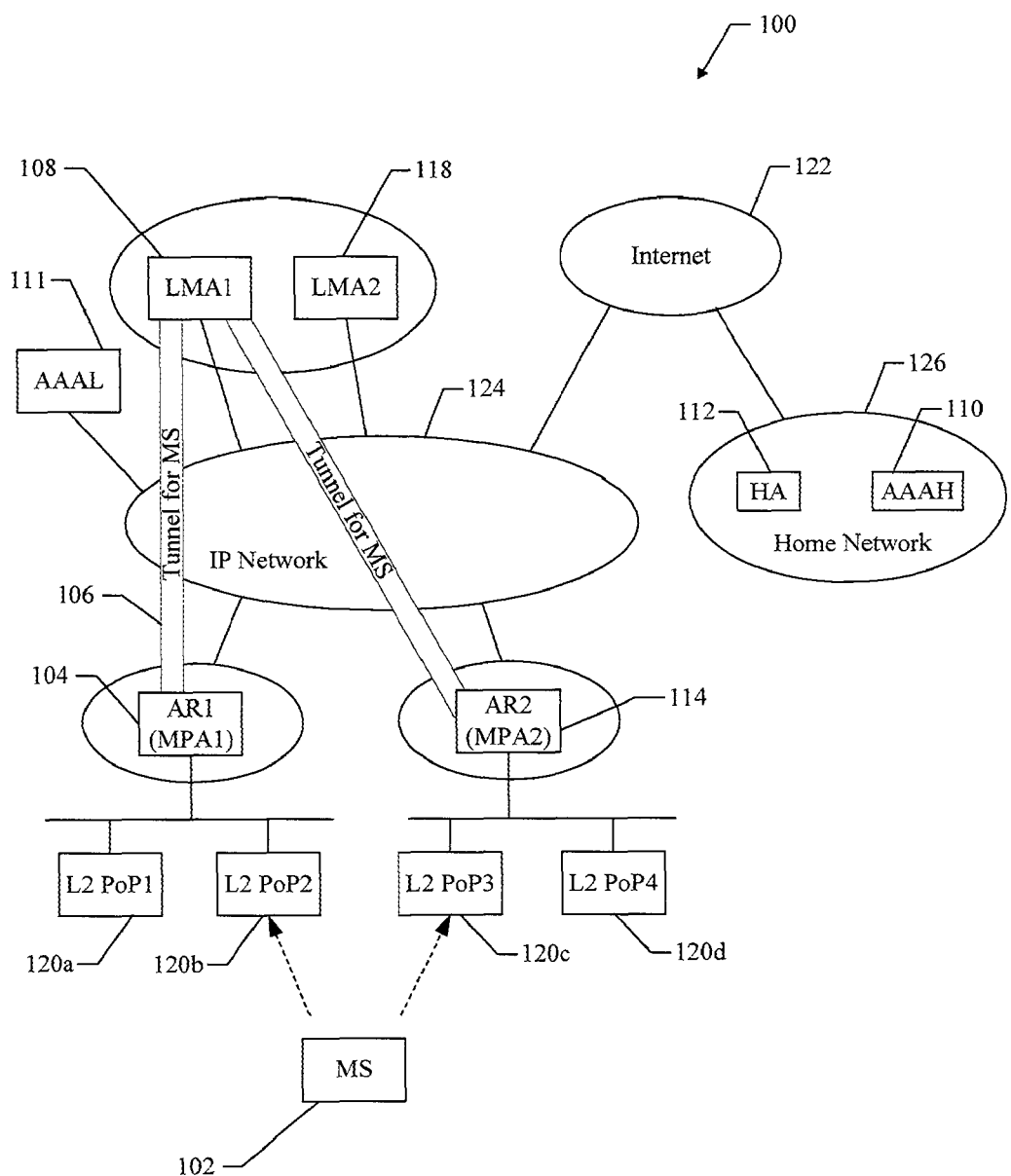
FIG. 1 shows a network that provides network-based IP mobility without host involvement.

FIG. 1 shows a network 100 that provides network-based IP mobility without host involvement. The abbreviations shown in FIG. 1 are defined as follows.

AAAH 110—Authentication, Authorization and Accounting Home server

AAAL 111—Authentication, Authorization and Accounting Local server

AR 104, 114—Access Router

HA 112—Home Agent

LMA 108, 118—Local Mobility Agent

MPA 104, 114—Mobility Proxy Agent

MS 102—Mobile Station

PoP 120a, 120b, 120c, 120d—Point of Presence

As illustrated in FIG. 1, as MS 102 moves around the network 100, its traffic is handled by an associated MPA 104 that sets up a tunnel 106 to route traffic through a centralized agent; namely LMA1 108. Unfortunately, routing traffic through LMA1 108 may result in latencies and/or other inefficiencies. In various aspects, the routing system operates to provide traffic routing over the shortest path between two nodes. Since the shortest path routing need not pass through the centralized agent (i.e., a LMA 108, 118), greater routing efficiency is achieved. In the following description, four scenarios of route optimization for network-based mobility are discussed. It should be noted that the MPA 104 114 may be also referred to and/or comprise a Mobile Access Gateway (MAG) that operates to route mobile traffic in the network in accordance with the various aspects. FIG. 1 also illustrates how the above mentioned servers, routers, agents and mobile stations relate to the Internet 122, an IP network 124 and a home network 126.

Figure 2:
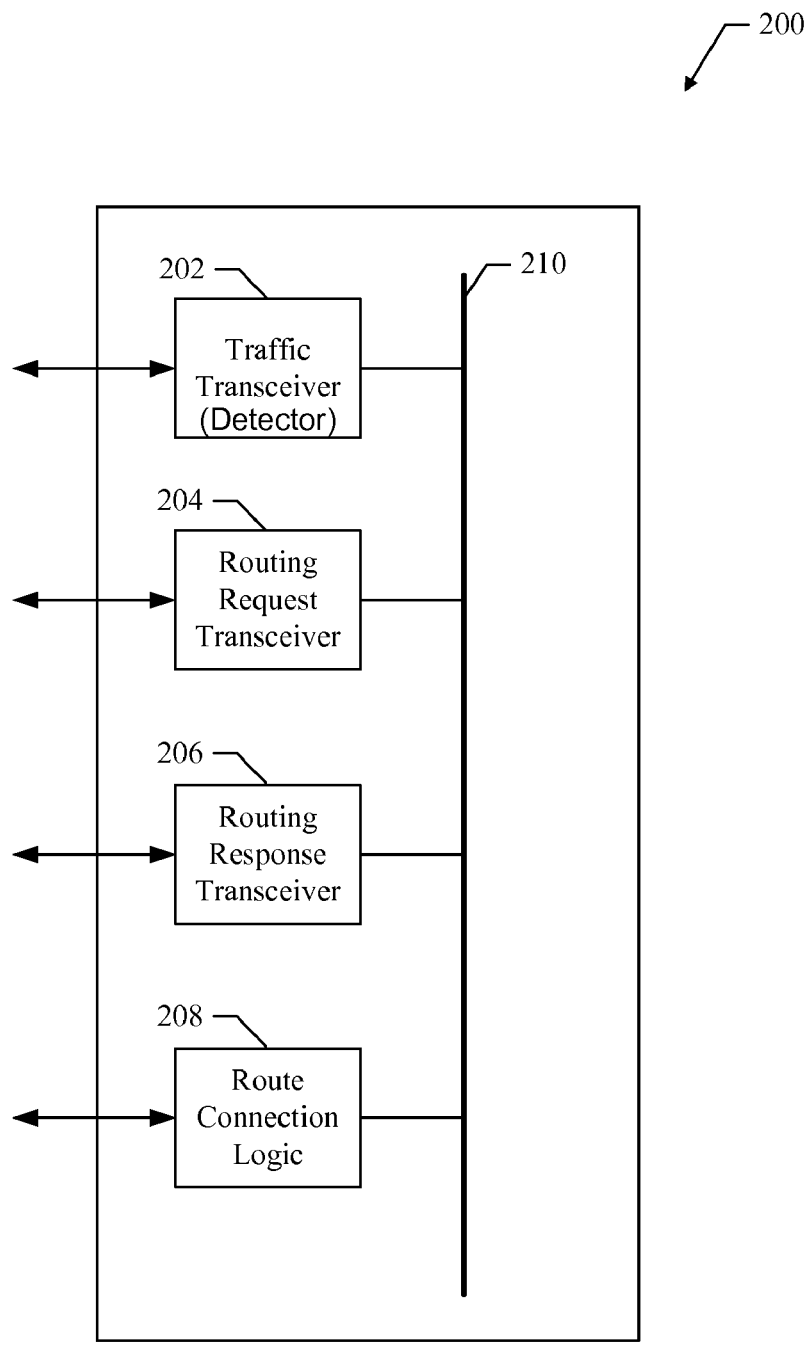
FIG. 2 shows exemplary mobility proxy agent logic for use in aspect of a routing system.

FIG. 2 shows exemplary mobility proxy agent logic 200 for use in aspects of a routing system. For example, the MPA logic 200 is suitable for use as the MPA 104 shown in FIG. 1. The MPA logic 200 comprises traffic transceiver 202, routing request transceiver 204, routing response transceiver 206, and route connection logic 202 all coupled to a data bus 210. It should be noted that all of the elements of the MPA 200 comprise logic to allow communication with other entities over a wireless and/or wired network. It should also be noted that the elements of the MPA 200 may send or receive messages in a secure fashion, (e.g., through the use of integrity protection between entities involved in the messaging). For example, messages may be formatted, encoded, and/or encrypted using any suitable technique or process.

The traffic transceiver 202 comprises at least one of a CPU, processor, gate array, hardware logic, memory elements, and/or hardware executing software. The traffic transceiver 202 operates to convey traffic between mobile stations and other network entities, such as other mobile stations or other types of nodes. In an aspect, the traffic transceiver 202 comprises detector logic that operates to detect tunneled traffic between a selected mobile station and other network entities. For example, the detector logic may detect tunneled packets transmitted to or from a mobile station. When such traffic is detected, an indication is send to the routing request transceiver 204.

Figure 9A:
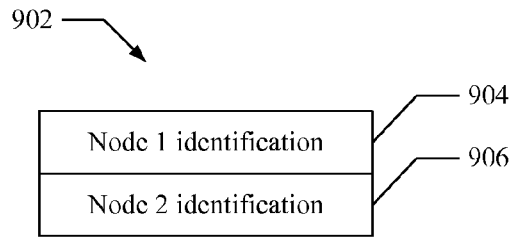
FIGS. 9A-B illustrate routing messages for use in aspects of a routing system.
Figure 9B:
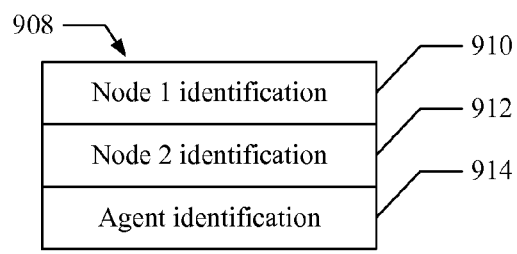

The routing request transceiver 204 comprises at least one of a CPU, processor, gate array, hardware logic, memory elements, and/or hardware executing software. The routing request transceiver 204 operates to generate, send, and receive route optimization requests to and from various network entities. In an aspect, the route optimization requests are formatted as illustrated in FIGS. 9A-B. The routing request transceiver 204 comprises transmitting logic that is configured to transmit route optimization requests to network entities, such as local mobility agents. In this case, the transmitted route optimization request comprises the identity of two nodes, such as two mobile stations, for which an optimized route is being requested.

In an aspect, the routing request transceiver 204 comprises receiving logic that is configured to receive route optimization requests from other network entities, such as local mobility agents. In an aspect, the received the route optimization requests identify two nodes for which an optimized route is being requested, and a MPA associated with one of the nodes. For example, the received route optimization request identifies a first mobile station, a second mobile station, and a MPA associated with the first mobile station.

The routing response transceiver 206 comprises at least one of a CPU, processor, gate array, hardware logic, memory elements, and/or hardware executing software. The routing response transceiver 206 operates to generate, send, and receive route optimization responses to and from various network entities. In an aspect, the route optimization responses are formatted as illustrated in FIGS. 9A-B. The routing response transceiver 206 comprises transmitting logic that is configured to transmit route optimization responses to network entities, such as local mobility agents. In an aspect, the transmitted route optimization responses comprise the identity of two nodes, such as two mobile stations, for which an optimized route is being requested.

In an aspect, the routing response transceiver 206 comprises receiving logic that is configured to receive route optimization responses from other network entities, such as local mobility agents. In an aspect, the received route optimization responses identify two nodes for which a route optimization is being requested, and a MPA associated with one of the nodes. For example, the received route optimization responses identify a first mobile station, a second mobile station, and a MPA associated with the second mobile station.

The route connection logic 208 comprises at least one of a CPU, processor, gate array, hardware logic, memory elements, and/or hardware executing software. The route connection logic 208 operates to establish optimized routing between MPAs to allow two nodes to efficiently communicate. For example, the route connection logic 208 communicates with similar logic at another MPA to establish an optimized routing path that directly links two MPAs. This optimized link avoids traffic routing through centralized LMAs which improves routing efficiency. In an aspect, the route connection logic 208 operates to route traffic over the established optimized route.

In an aspect, the routing system comprises a computer program product comprising one or more program instructions ("instructions") or sets of "codes" stored or embodied on a machine-readable medium, which when executed by at least one processor, for instance, a processor at the MPA logic 200, provides the functions described herein. For example, the sets of codes may be loaded into the MPA logic 200 from a machine-readable medium, such as a floppy disk, CDROM, memory card, FLASH memory device, RAM, ROM, or any other type of machine-readable medium that interfaces to the MPA logic 200. In another aspect, the sets of codes may be downloaded into the MPA logic 200 from an external device or network resource. The sets of codes, when executed, provide aspects of a routing system as described herein.

Efficient Routing within One Mobility Proxy Agent

Figure 3:
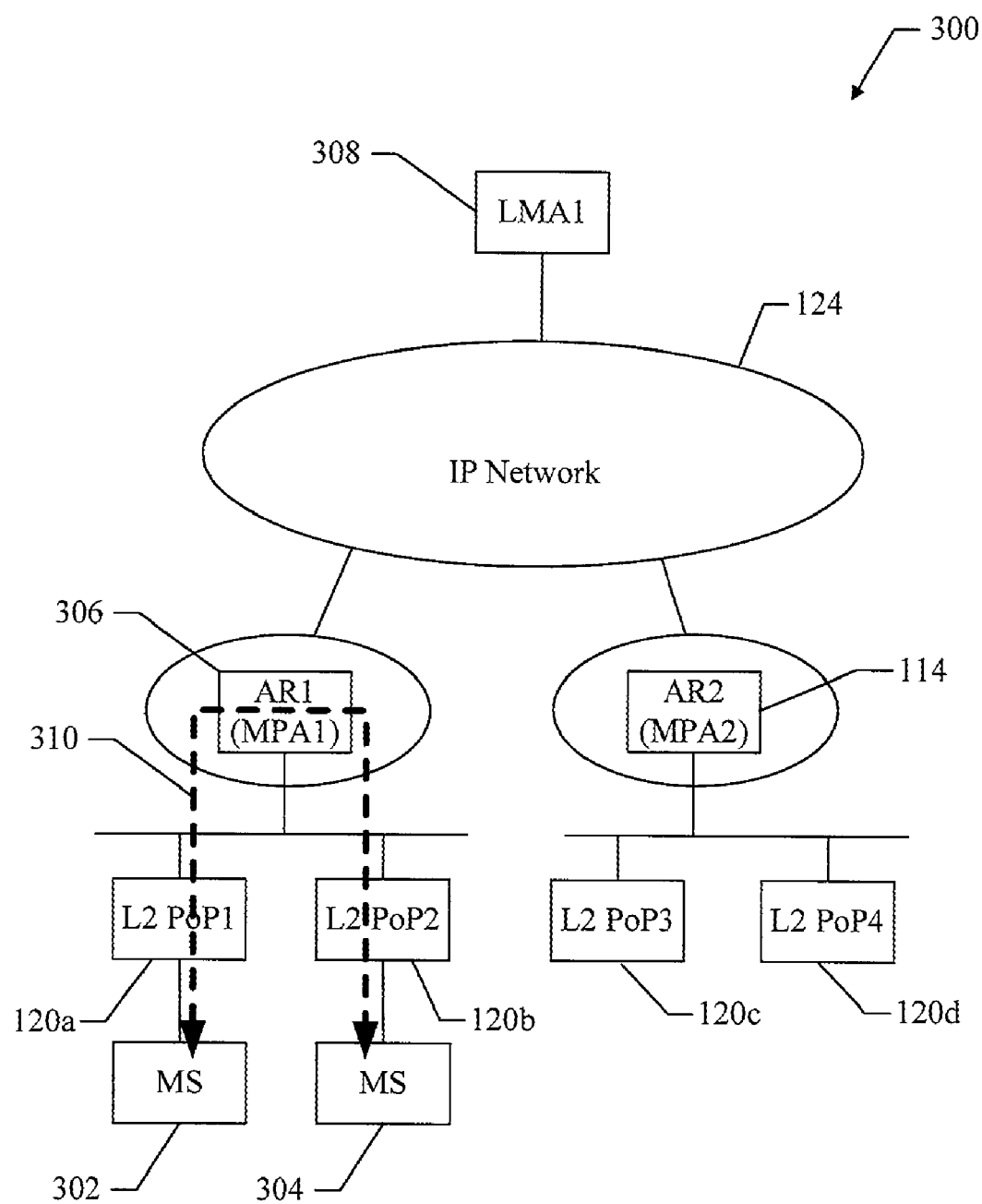
FIG. 3 shows a network that illustrates how efficient routing between two mobile stations is provided by aspects of the routing system.

FIG. 3 shows a network 300 that illustrates how efficient routing between two mobile stations is provided by aspects of the routing system. For example, the network 300 illustrates how an efficient (or optimized) route is established between two mobile stations (302, 304) associated with one MPA.

The two mobile stations (302, 304) communicate under the control of the same MPA; namely MPA1 306. Communications between the two mobile stations (302, 304) may occur under the control of a central LMA1 308. However, routing traffic through LMA1 308 may not be very efficient. In an aspect, the MPA1 306 operates to route traffic packets directly between the mobile stations (302, 304), as shown by route 310. In an aspect, the MPA1 306 may need to request authorization from the LMA1 308 to establish the efficient route 310. Once authorization is received, the efficient route 310 is established so that traffic will be routed between the two mobile stations (302, 304) without having to pass through the centralized LMA1 308.

Efficient Routing within One Network Domain

Figure 4:
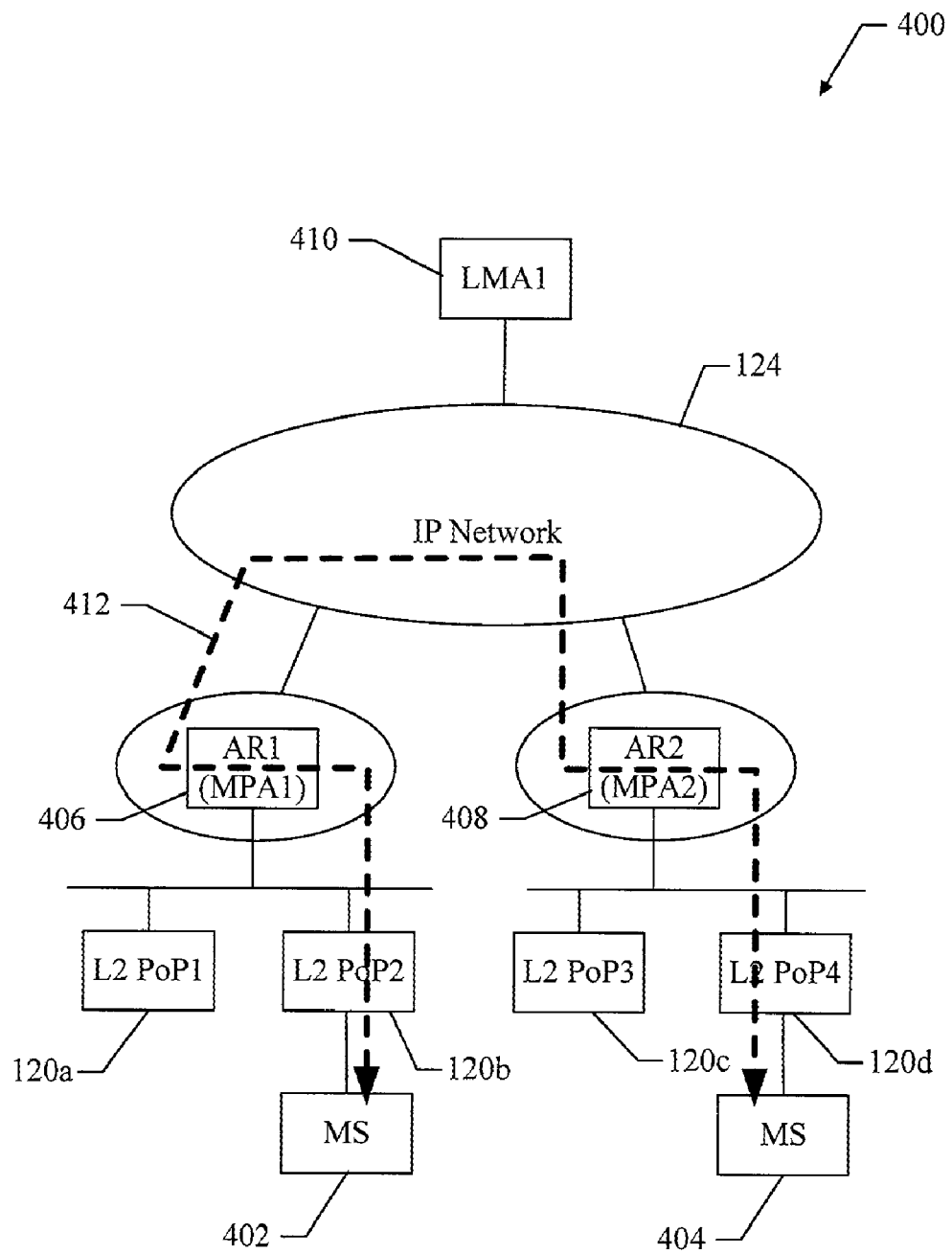
FIG. 4 shows a network that illustrates how efficient routing between two mobile stations is provided by aspects of the routing system.

FIG. 4 shows a network 400 that illustrates how efficient routing between two mobile stations is provided by aspects of the routing system. For example, the network 400 illustrates how an efficient (or optimized) route is established between two mobile stations (402, 404) within one network domain.

The two mobile stations (402, 404) communicate under the control of MPA1 406, and MPA2 408, respectively. Traffic between the two mobile stations (402, 404) may be routed through LMA1 410. However, routing traffic through LMA1 410 may not be very efficient. In an aspect, the MPA1 406 and MPA2 408 operate to communicate with the LMA1 410 to establish more efficient routing. In an aspect, the MPA1 406 and MPA2 408 request authorization from the LMA1 410 to establish more efficient traffic routing. Once authorization is received, the two MPAs (406, 408) communicate with each other to establish the efficient route 412 so that traffic will be routed directly between the two mobile stations (402, 404).

Efficient Routing Across Network Domains

Figure 5:
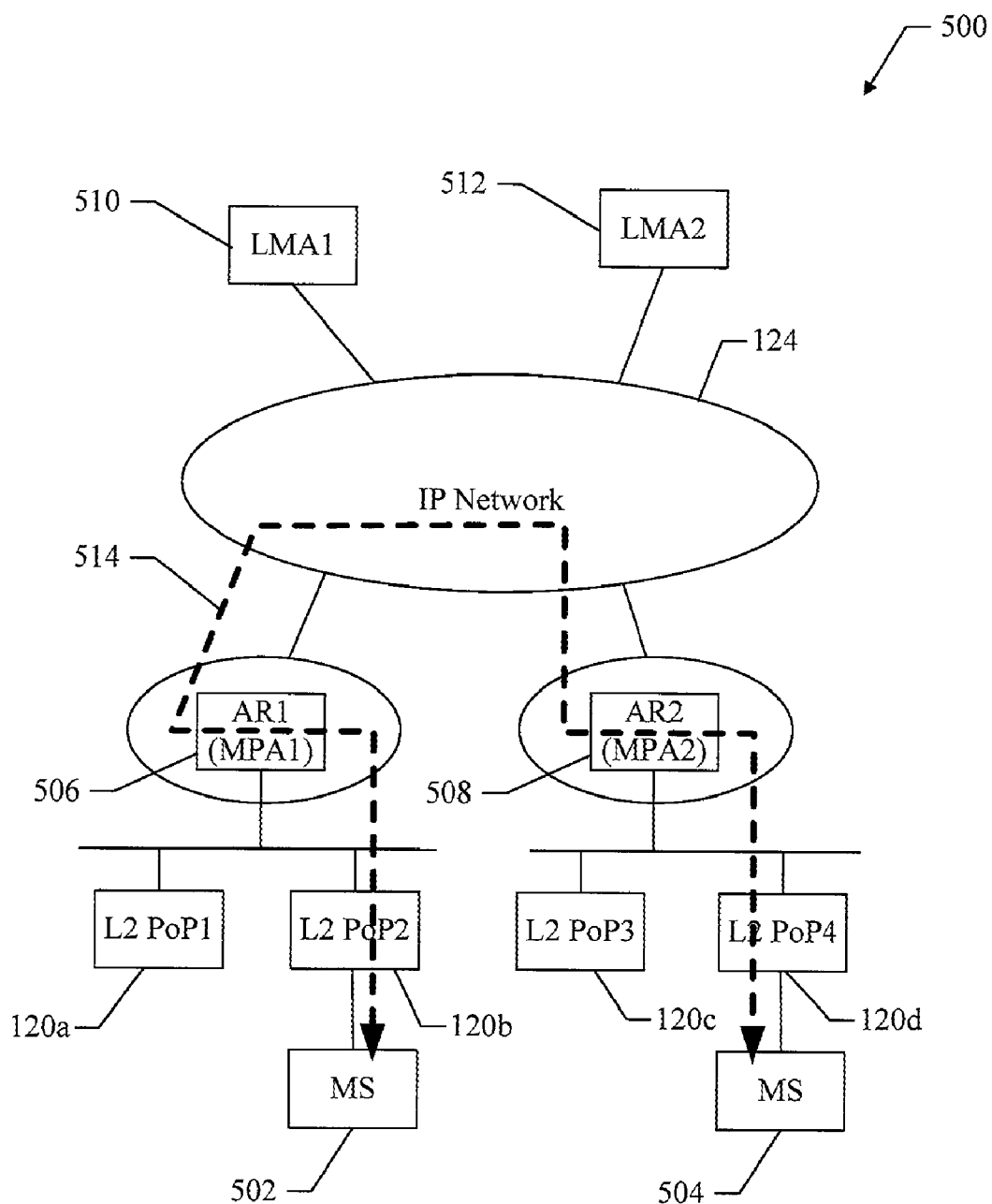
FIG. 5 shows a network that illustrates how efficient routing between two mobile stations is provided by aspects of the routing system.

FIG. 5 shows a network 500 that illustrates how efficient routing between two mobile stations is provided by aspects of the routing system. For example, the network 500 illustrates how an efficient (or optimized) route is established between two mobile stations (502, 504) across Network domains.

The two mobile stations (502, 504) communicate under the control of MPA1 506, and MPA2 508, respectively. The MPA1 506 is associated with LMA1 510 and the MPA2 508 is associated with the LMA2 512. Traffic between the two mobile stations (502, 505) may be routed through their associated LMAs (510, 512). However, routing traffic through the LMAs (510, 512) may not be very efficient. In an aspect, the MPA1 506 and MPA2 508 operate to communicate with their respective LMAs (510, 512) to establish more efficient routing. In an aspect, the MPA1 506 and MPA2 508 request authorization from the LMA1 510 and LMA2 512, respectively, to establish more efficient traffic routing. Once authorization is received, the MPA1 506 and MPA2 508 communicate with each other to establish the efficient route 514 so that traffic will be routed directly between the two MPAs (506, 508) without passing through the LMAs (510, 512).

Network Signaling for Efficient Routing Between Mobile Stations

Figure 6:
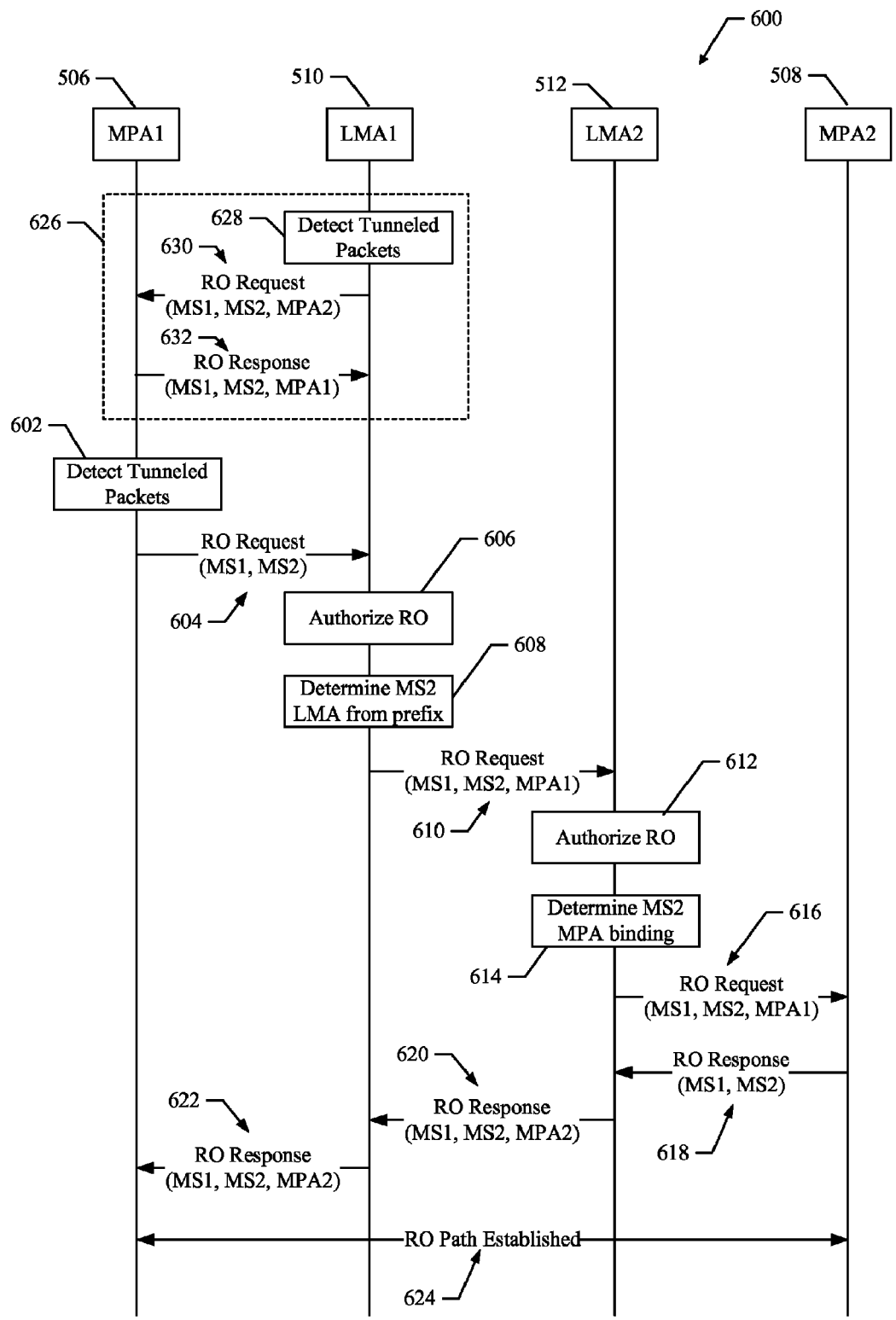
FIG. 6 shows signaling diagram that illustrates network signaling provided in aspects of a routing system.

FIG. 6 shows signaling diagram 600 that illustrates network signaling provided in aspects of a routing system. For clarity, the signaling diagram 600 is discussed below with reference to the network 500 of FIG. 5. Furthermore, it will be assumed that the MPAs 506 and 508 are configured as the MPA 200 shown in FIG. 2. The signaling diagram 600 shows network signaling provided to enable efficient routing of traffic between the mobile stations 502 and 504. It should be noted that although the signaling diagram 600 is discussed with reference to FIG. 5, minor modifications may be made to obtain network signaling to provide efficient routing for the network configurations illustrated in FIG. 3 and FIG. 4 as well. It should also be noted that the signaling described with reference to FIG. 6 may be performed in a secure fashion, (e.g., through the use of integrity protection between entities involved in the messaging). For example, messages may be formatted, encoded, and/or encrypted using any suitable technique or process.

The signaling diagram 600 illustrates signaling between the MPA1 506, the LMA1 510 that is associated with MPA1 506, the MPA2 508, and the LMA2 512 that is associated with MPA2 508. In an aspect, the following operations are performed.

At 602, tunneled packets transmitted between the first and second mobile stations (502, 504) are detected by the MPA1 506. In an aspect, the detector logic of the traffic transceiver 202 operates to detect the tunneled packets.

At 604, a route optimization request is transmitted from the MPA1 506 to the LMA1 510. In an aspect, the routing request transceiver 204 operates to transmit the route optimization request to the LMA1 510. The route optimization request identifies the MS1 502 and the MS2 504.

At 606, the LMA1 510 authorizes the routing optimization and at 608, identifies LMA2 512 from the request message.

At 610, a route optimization request is transmitted from LMA1 510 to LMA2 512. The request identifies MS1 502, MS2 504, and MPA1 506.

At 612, the LMA2 512 authorizes the routing optimization and at 614, identifies MPA2 508 from the request message.

At 616, a route optimization request is transmitted to MPA2 508 that identifies MS1 502, MS2 504, and MPA1 506. In an aspect, the route optimization request is received at the MPA2 508 by the routing request transceiver 204.

At 618, a route optimization response message is transmitted from the MPA2 508 to the LMA2 512 that acknowledges the routing optimization. In an aspect, the route optimization response is transmitted by the routing response transceiver 206.

At 620, the route optimization response message is transmitted from the LMA2 512 to the LMA1 510 to acknowledge the routing optimization. The route optimization response message identifies MS1 502, MS2, 504, and MPA2 508.

At 622, the route optimization response message is transmitted from the LMA1 510 to the MPA1 506 to acknowledge the routing optimization.

At 624, the MPA1 506 communicates with the MPA2 508 to establish an optimized routing for traffic between MS1 502 and MS2 504. In an aspect, the route connection logic 208 operates to establish the routing connection between the MPA1 506 and the MPA2 508. In the optimized routing, traffic is routed directly between the MPA1 506 and MPA2 508 without having to be routed through LMA1 510 or LMA2 512. In an aspect, route connection logic 208 operates to route the traffic over the optimized route 624.

Thus, the signaling diagram 600 operates to provide aspects of a routing system to establish efficient routing in a wireless network. It should be noted that the signaling diagram 600 represents just one implementation and that other implementations are possible within the scope of the aspects.

Alternative Network Signaling

In various aspects, the signaling diagram 600 can be modified to provide network signaling to support the network configurations illustrated in FIG. 3 and FIG. 4. In these configurations, two mobile stations are associated with a single LMA (i.e., LMA1).

With respect to the network configuration of FIG. 3, the signaling diagram 600 is modified so as to remove the operations of 608 through 620. Once the LMA1 receives the route optimization request 604, it authorizes the optimization at 606, and then transmits the route optimization response at 622. The MPA1 then provides the optimized route 310 shown in FIG. 3.

With respect to the network configuration shown in FIG. 4, the signaling diagram 600 is modified to remove communications to LMA2. The LMA1 transmits the route optimization request 610 to the MPA2, and the MPA2 transmits its route optimization response message 618 back to LMA1. The other signaling shown in FIG. 6 remains the same, and the result is that the optimized route 412 shown in FIG. 4 is established between MPA1 and MPA2.

In another aspect, the signaling diagram 600 can be modified to support a network configuration where an LMA initiates the route optimization process. In this configuration, the LMA1 510 is configured like the MPA 200 shown in FIG. 2. The signaling diagram 600 is then modified to remove the operations at 602 and 604. These operations are replaced by operations 626. In operations 626, the LMA1 operates to detect tunneled packets 628 associated with a mobile station, authorizes route optimization at 606, and transmit a route optimization request message 630 to MPA1. In response to the route optimization request message 630, the MPA1 transmits a response message 632. The remaining operations of the signaling diagram 600 remain the same. For example, the MPA2 also transmits a response message 618 that is received by the LMA1 510 as shown at 620. As a result, the LMA1 operates to initiate the route optimization process to establish the route optimized path 624.

Efficient Routing to a Fixed Correspondent Node

Figure 7:
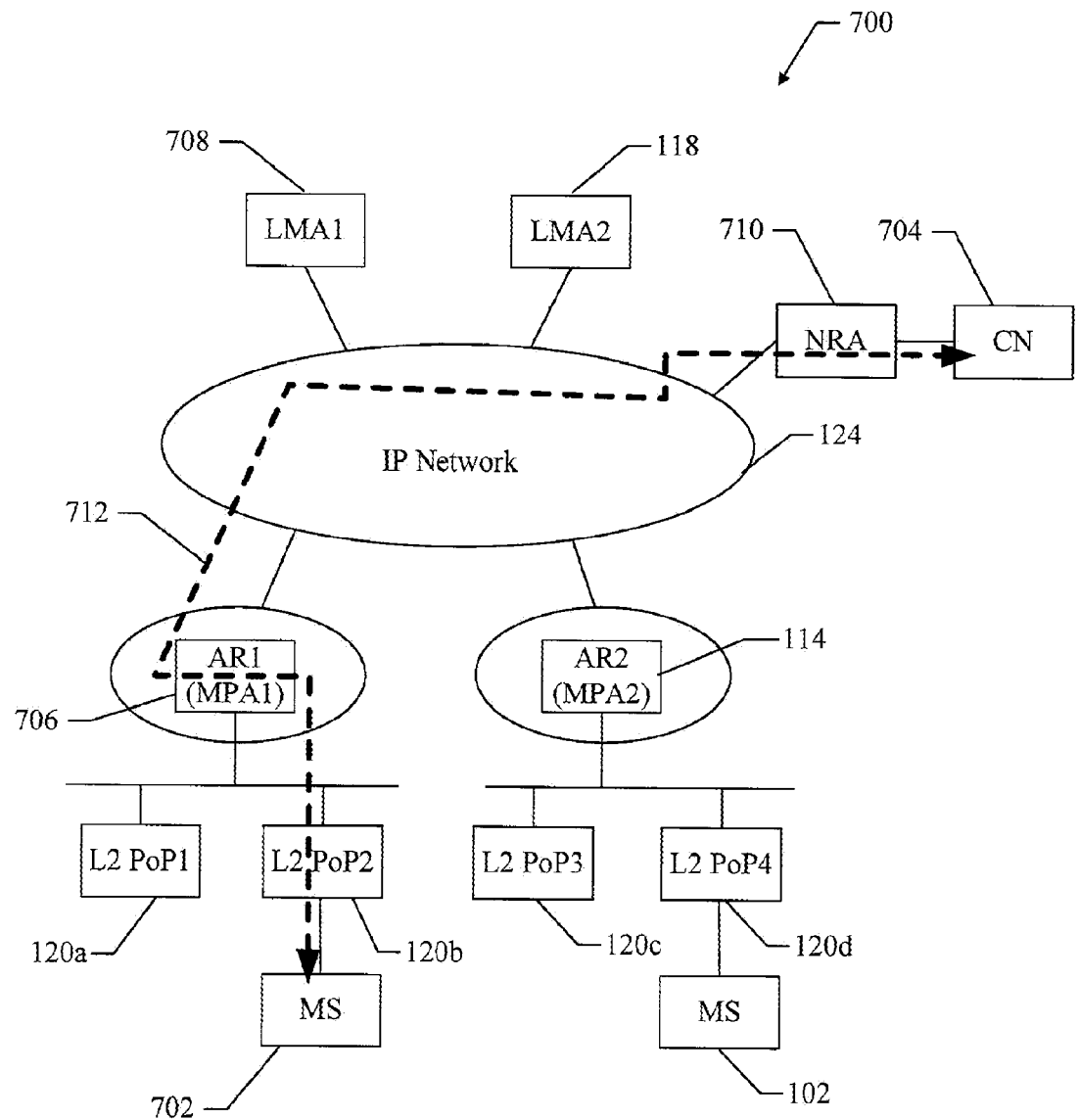
FIG. 7 shows a network that illustrates how efficient routing between a mobile station and a fixed Correspondent Node (CN) is provided by aspects of the routing system.

FIG. 7 shows a network 700 that illustrates how efficient routing between a mobile station and a fixed Correspondent Node (CN) is provided by aspects of the routing system. For example, the network 700 illustrates how an efficient (or optimized) route is established between the mobile station 702 and the fixed CN 704.

The mobile station 702 communicates in the network 700 under the control of MPA1 706, which is associated with LMA1 708. The CN 704 communicates in the network 700 under the control of a network routing agent (NRA) 710. In an aspect, the MPA1 706 and NRA 710 are configured as the MPA 200 shown in FIG. 2. Traffic between the mobile station 702 and the CN 704 may be routed through the LMA1 708. However, routing traffic through LMA1 708 may not be very efficient. In an aspect, the MPA1 706 and the NRA 710 operate to establish more efficient routing. To do this, the MPA1 706 and the NRA 710 obtain authorization from the LMA1 708 to establish more efficient traffic routing. Once authorization is received, the efficient route 712 is established so that traffic will be routed directly between the MPA 706 and the NRA 710 while bypassing LMA1 708.

Network Signaling for Efficient Routing to Fixed Correspondent Nodes

Figure 8:
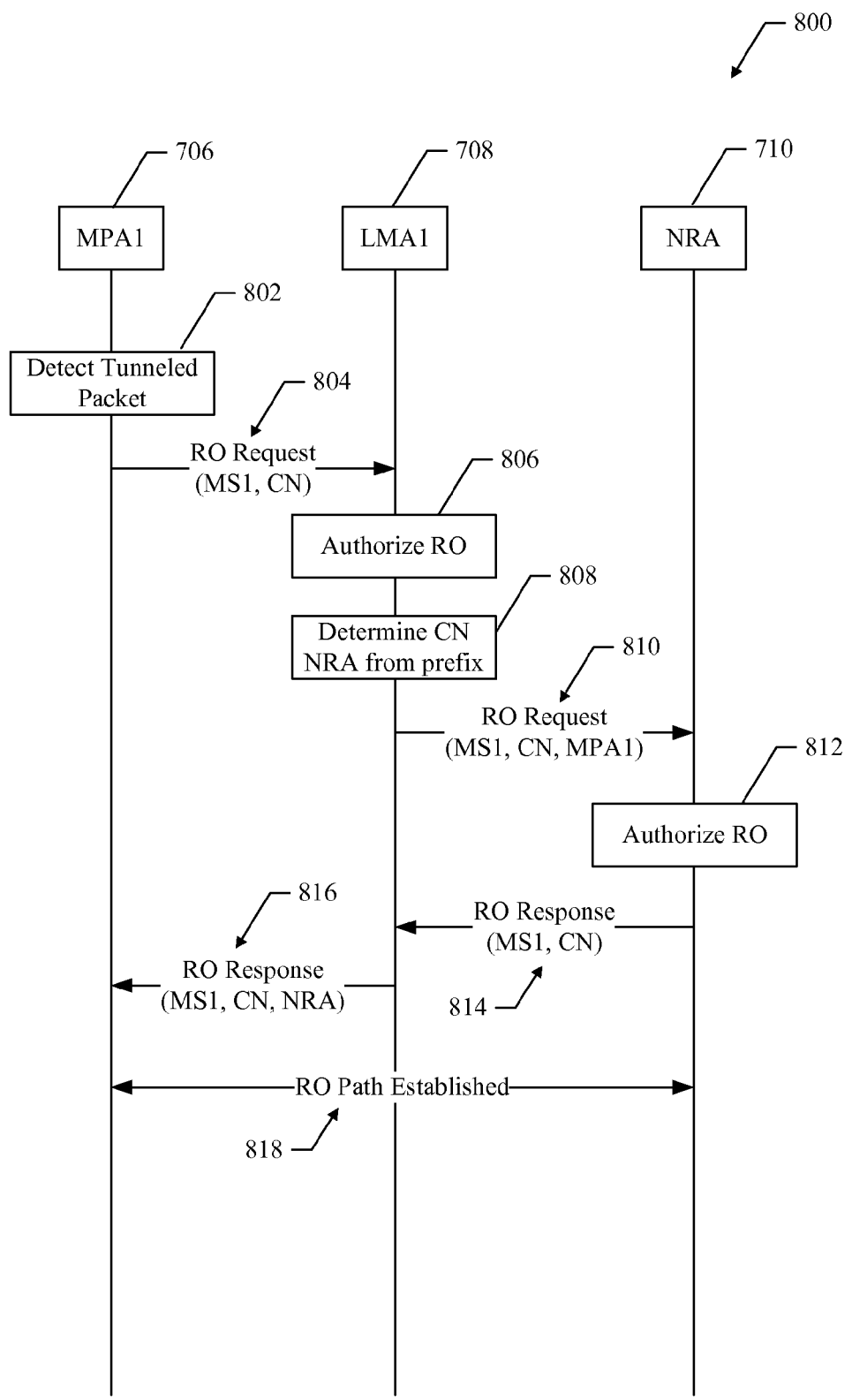
FIG. 8 shows signaling diagram that illustrates network signaling provided in aspects of a routing system.

FIG. 8 shows signaling diagram 800 that illustrates network signaling provided in aspects of a routing system. For clarity, the signaling diagram 800 is discussed below with reference to the network 700 of FIG. 7. Furthermore, it will be assumed that the MPA 706 and NRA 710 are configured as the MPA 200 shown in FIG. 2. However, since packets sent to and from the NRA 710 are not tunneled, the NRA 710 may not be configured to initiate route optimization. For example, the NRA 710 may not be aware that the CN 704 is corresponding with a mobile node that is using NETLMM protocols. Thus, it will be assumed that the MPA 706 initiates route optimization.

The signaling diagram 800 shows network signaling provided to enable efficient routing of traffic between the mobile station 702 and the CN 704. The signaling diagram 800 illustrates signaling between the MPA1 706, the LMA1 708, and the NRA 710. In an aspect, the following operations are performed.

At 802, tunneled packets transmitted between the MS 702 and the CN 704 are detected by the MPA1 706. In an aspect, the detector logic of the traffic transceiver 202 operates to detect the tunneled packets.

At 804, a routing optimization request is transmitted from the MPA1 706 to the LMA1 708. In an aspect, the routing request transceiver 204 operates to transmit the routing optimization request to the LMA1 708. The routing request identifies the MS 702 and the CN 704.

At 806, the LMA1 708 authorizes the routing optimization, and at 808, identifies the NRA 710 from the request message.

At 810, a routing optimization request is transmitted from LMA1 708 to the NRA 710. The request identifies MS1 702, CN 704, and MPA1 706.

At 812, the NRA 710 authorizes the requested optimized routing.

At 814, a routing optimization response message is transmitted from the NRA 710 that acknowledges the routing optimization and identifies the MS 702 and the CN 704

At 816, a routing optimization response message is transmitted from the LMA1 708 to the MPA1 706 that acknowledges the routing optimization. The response message identifies the MS 702, CN 704, and the NRA 710.

At 818, the MPA1 706 communicates with the NRA 710 to establish an optimized routing for traffic between MS1 702 and the CN 704. In an aspect, the route connection logic 208 operates to establish the routing connection between the MPA1 706 and the NRA 710. In the optimized routing, traffic is routed directly between the MPA1 706 and NRA 710 without having to be routed through LMA1 708.

Thus, the signaling diagram 800 operates to provide aspects of a routing system to establish efficient routing in a wireless network. It should be noted that the signaling diagram 800 represents just one implementation and that other implementations are possible within the scope of the aspects.

FIGS. 9A-B illustrate request and response messages for use in aspects of a routing system. A route optimization request message 902 is shown in FIG. 9A. In an aspect, the route optimization request message 902 is generated by and transmitted from the routing request transceiver 204. In another aspect, the route optimization request message is received by the routing request transceiver 204. The route optimization request message 902 identifies a first node 904 and a second node 906 between which an optimized routing path is desired. For example, the first and second node identifiers (904, 906) may identify mobile stations or fixed correspondent nodes.

FIG. 9B shows a route optimization response message 908. In an aspect, the route optimization response message 908 is generated and transmitted by routing response transceiver 206. In another aspect, the route optimization response message 908 may be received by the routing request transceiver 204. The routing message 908 comprises node identifiers 910 and 912, and an agent identifier 914. In an aspect, the node identifiers 910 and 912 may identify mobile stations or fixed CNs, and the agent identifier 914 may identify MPAs or NRAs. It should be noted that the messages shown in FIGS. 9A-B may be formatted in any suitable format, scrambled or encrypted, and transmitted over a network using any desired transmission mechanism.

Figure 10:
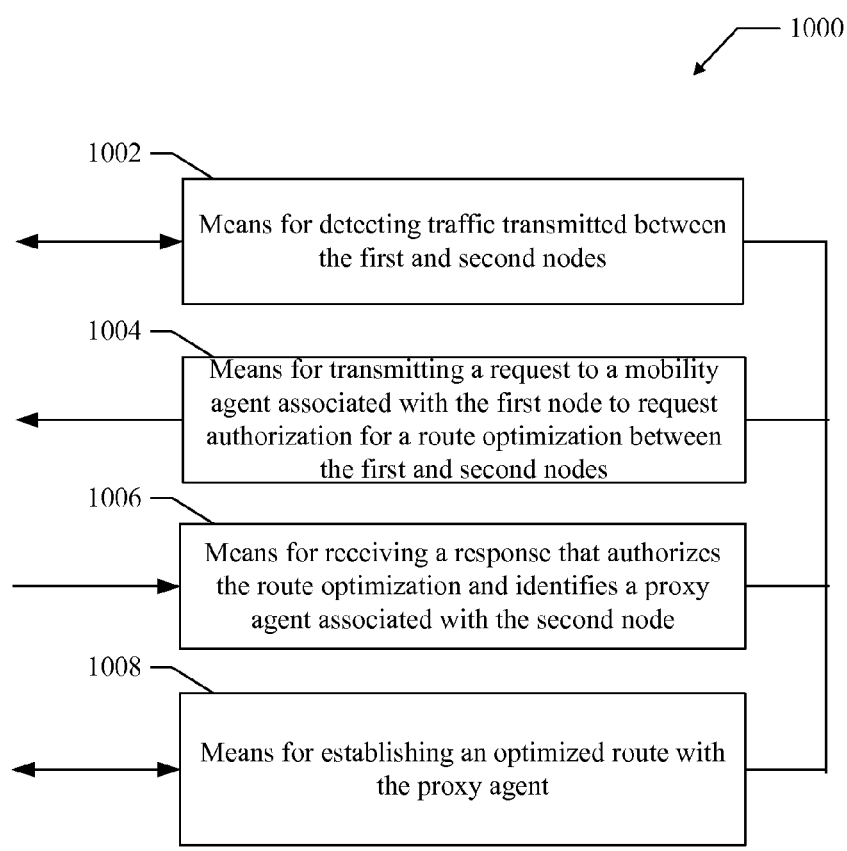
FIG. 10 shows an example of MPA logic for use in aspects of a routing system.

FIG. 10 shows an example of MPA logic 1000 for use in aspects of a routing system. For example, the MPA logic 1000 is suitable for use as the MPA logic 200 shown in FIG. 2. In an aspect, the MPA logic 1000 is implemented by at least one integrated circuit comprising one or more modules configured to provide aspects of a routing system as described herein.

The MPA logic 1000 comprises a first module comprising means (1002) for detecting traffic transmitted between the first and second nodes. In an aspect, the means 1002 comprises the traffic transceiver 202. The MPA logic 1000 also comprises a second module comprising means (1004) for transmitting a request to a mobility agent associated with the first node to request authorization for a route optimization between the first and second nodes. In an aspect, the means 1004 comprises the routing request transceiver 204. The MPA logic 1000 also comprises a third module comprising means (1006) for receiving a response that authorizes the route optimization and identifies a proxy agent associated with the second node. In an aspect, the means 1006 comprises the routing response transceiver 206. The MPA logic 1000 also comprises a fourth module comprising means (1008) for establishing an optimized route with the proxy agent. In an aspect, the means 1008 comprises the route connection logic 208.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a routing system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

The invention claimed is:

1. A method for traffic routing between first and second nodes in a communication network, the method comprising:
    detecting traffic transmitted between the first and second nodes;
    transmitting, from a first proxy agent, a request to a mobility agent associated with the first node to request authorization for a route optimization between the first and second nodes, wherein said transmitting comprises generating the request to comprise a first identifier associated with the first node and a second identifier associated with the second node;
    receiving a response that authorizes the route optimization; and
    establishing an optimized route.

2. The method of claim 1, further comprising:
    receiving the response that authorizes the route optimization, wherein the response identifies a second proxy agent associated with the second node; and
    establishing the optimized route with the second proxy agent.

3. The method of claim 1, wherein said detecting comprises detecting one or more tunneled packets transmitted between the first and second nodes.

4. The method of claim 1, wherein said receiving comprises receiving the response from the mobility agent.

5. The method of claim 1, wherein said establishing comprises routing the traffic between the first and second nodes over the optimized route.

6. An apparatus for traffic routing between first and second nodes in a communication network, the apparatus comprising:
    a processor configured with software to perform operations comprising:
        detecting-traffic transmitted between the first and second nodes;
        transmitting, from a first proxy agent, a request to a mobility agent associated with the first node to request authorization for a route optimization between the first and second nodes, wherein the request comprises a first identifier associated with the first node and a second identifier associated with the second node;
        receiving a response that authorizes the route optimization; and
        establishing an optimized route.

7. The apparatus of claim 6, wherein the processor is configured with software to perform operations such that:
    receiving a response that authorizes the route optimization comprises receiving a response that identifies a second proxy agent associated with the second node, and
    establishing an optimized route comprises establishing an optimized route with the second proxy agent.

8. The apparatus of claim 6, wherein the processor is configured with software to perform operations such that detecting-traffic transmitted between the first and second nodes comprises detecting one or more tunneled packets transmitted between the first and second nodes.

9. The apparatus of claim 6, wherein the processor is configured with software to perform operations such that receiving a response that authorizes the route optimization comprises receiving the response from the mobility agent.

10. The apparatus of claim 6, wherein the processor is configured with software to perform operations further comprising routing the traffic between the first and second nodes over the optimized route.

11. An apparatus for traffic routing between first and second nodes in a communication network, the apparatus comprising:
    means for detecting traffic transmitted between the first and second nodes;
    means for transmitting, from a first proxy agent, a request to a mobility agent associated with the first node to request authorization for a route optimization between the first and second nodes, wherein said means for transmitting comprises means for generating the request to comprise a first identifier associated with the first node and a second identifier associated with the second node;
    means for receiving a response that authorizes the route optimization; and
    means for establishing an optimized route.

12. The apparatus of claim 11, further comprising:
    means for receiving the response that authorizes the route optimization, wherein the response identifies a second proxy agent associated with the second node; and
    means for establishing the optimized route with the second proxy agent.

13. The apparatus of claim 11, wherein said means for detecting comprises means for detecting one or more tunneled packets transmitted between the first and second nodes.

14. The apparatus of claim 11, wherein said means for receiving comprises means for receiving the response from the mobility agent.

15. The apparatus of claim 11, wherein said means for establishing comprises means for routing the traffic between the first and second nodes over the optimized route.

16. A computer program product for traffic routing between first and second nodes in a communication network, the computer program product comprising:
    a non-transitory machine-readable medium embodying:
        a first set of codes for causing a computer to detect traffic transmitted between the first and second nodes;
        a second set of codes for causing the computer to transmit, from a first proxy agent, a request to a mobility agent associated with the first node to request authorization for a route optimization between the first and second nodes, wherein said second set of codes are configured to cause the computer to generate the request to comprise a first identifier associated with the first node and a second identifier associated with the second node;

a third set of codes for causing the computer to receive a response that authorizes the route optimization; and a fourth set of codes for causing the computer to establish an optimized route.

17. The machine-readable medium of claim 16, wherein the third set of codes are configured to cause the computer to receive the response that authorizes the route optimization, wherein the response identifies a second proxy agent associated with the second node, and the fourth set of codes are configured to cause the computer to establish the optimized route with the second proxy agent.

18. The machine-readable medium of claim 16, wherein said first set of codes are configured to cause the computer to detect one or more tunneled packets transmitted between the first and second nodes.

19. The machine-readable medium of claim 16, wherein said third set of codes are configured to cause the computer to receive the response from the mobility agent.

20. The machine-readable medium of claim 16, wherein said fourth set of codes are configured to cause the computer to route the traffic between the first and second nodes over the optimized route.

21. At least one integrated circuit configured for providing traffic routing between first and second nodes in a communication network, the at least one integrated circuit comprising:

a first module configured for causing the at least one integrated circuit to detect traffic transmitted between the first and second nodes;

a second module configured for transmitting, from a first proxy agent, a request to a mobility agent associated with the first node to request authorization for a route optimization between the first and second nodes, wherein said second module is configured for generating the request to comprise a first identifier associated with the first node and a second identifier associated with the second node;

a third module configured for receiving a response that authorizes the route optimization; and a fourth module configured for establishing an optimized route.

22. The at least one integrated circuit of claim 21, wherein said third module is configured for receiving the response that authorizes the route optimization, wherein the response identifies a second proxy agent associated with the second node, and said fourth module is configured for establishing the optimized route with the second proxy agent.

23. The at least one integrated circuit of claim 21, wherein said first module is configured for detecting one or more tunneled packets transmitted between the first and second nodes.

24. The at least one integrated circuit of claim 21, wherein said third module is configured for receiving the response from the mobility agent.

25. The at least one integrated circuit of claim 21, wherein said fourth module is configured for routing the traffic between the first and second nodes over the optimized route.

26. A method for traffic routing between first and second nodes in a communication network, the method comprising:

receiving a request for a route optimization between the first and second nodes, wherein the request identifies a first proxy agent associated with the first node;

transmitting a response from a second proxy agent associated with the second node, wherein the response includes a first identifier associated with the first node and a second identifier associated with the second node; and establishing an optimized route between the first proxy agent and the second proxy agent.

27. The method of claim 26, wherein said receiving comprises receiving the request from a mobility agent.

28. The method of claim 26, wherein said transmitting comprises transmitting the response to a mobility agent.

29. The method of claim 26, wherein said establishing comprises routing the traffic between the first and second nodes over the optimized route.

30. The method of claim 26, wherein the second proxy agent comprises a network routing agent.

31. An apparatus for traffic routing between first and second nodes in a communication network, the apparatus comprising:

receiving logic configured to receive a request for a route optimization between the first and second nodes, wherein the request identifies a first proxy agent associated with the first node;

transmitting logic configured to transmit a response from a second proxy agent associated with the second node, wherein the response includes a first identifier associated with the first node and a second identifier associated with the second node; and connection logic configured to cause at least one processor to establish an optimized route between the first proxy agent and the second proxy agent.

32. The apparatus of claim 31, wherein said receiving logic is configured to receive the request from a mobility agent.

33. The apparatus of claim 31, wherein said transmitting logic is configured to transmit the response to a mobility agent.

34. The apparatus of claim 31, wherein said connection logic is configured to route the traffic between the first and second nodes over the optimized route.

35. The apparatus of claim 31, wherein the second proxy agent comprises a network routing agent.

36. An apparatus for traffic routing between first and second nodes in a communication network, the apparatus comprising:

means for receiving a request for a route optimization between the first and second nodes, wherein the request identifies a first proxy agent associated with the first node;

means for transmitting a response from a second proxy agent associated with the second node, wherein the response includes a first identifier associated with the first node and a second identifier associated with the second node; and means for establishing an optimized route between the first proxy agent and the second proxy agent.

37. The apparatus of claim 36, wherein said means for receiving comprises means for receiving the request from a mobility agent.

38. The apparatus of claim 36, wherein said means for transmitting comprises means for transmitting the response to a mobility agent.

39. The apparatus of claim 36, wherein said means for establishing comprises means for routing the traffic between the first and second nodes over the optimized route.

40. The apparatus of claim 36, wherein the second proxy agent comprises a network routing agent.

41. A computer program product for traffic routing between first and second nodes in a communication network, the computer program product comprising:
  a non-transitory machine-readable medium embodying:
    a first set of codes for causing a computer to receive a request for a route optimization between the first and second nodes, wherein the request identifies a first proxy agent associated with the first node;
    a second set of codes for causing the computer to transmit a response from a second proxy agent associated with the second node, wherein the response includes a first identifier associated with the first node and a second identifier with the second node; and
    a third set of codes for causing the computer to establish an optimized route between the first proxy agent and the second proxy agent.

42. The machine-readable medium of claim 41, wherein said first set of codes are configured to cause the computer to receive the request from a mobility agent.

43. The machine-readable medium of claim 41, wherein said second set of codes are configured to cause the computer to transmit the response to a mobility agent.

44. The machine-readable medium of claim 41, wherein said third set of codes are configured to cause the computer to route the traffic between the first and second nodes over the optimized route.

45. The machine-readable medium of claim 41, wherein the second proxy agent comprises a network routing agent.

46. At least one integrated circuit for traffic routing between first and second nodes in a communication network, the at least one integrated circuit comprising:
  a first module for causing a computer to receive a request for a route optimization between the first and second nodes, wherein the request identifies a first proxy agent associated with the first node;
  a second module for causing the computer to transmit a response from a second proxy agent associated with the second node, wherein the response includes a first identifier associated with the first node and a second identifier associated with the second node; and
  a third module for causing at least one processor of the computer to establish an optimized route between the first proxy agent and the second proxy agent.

47. The at least one integrated circuit of claim 46, wherein said first module is configured for receiving the request from a mobility agent.

48. The at least one integrated circuit of claim 46, wherein said second module is configured for transmitting the response to a mobility agent.

49. The at least one integrated circuit of claim 46, wherein said third module is configured for routing the traffic between the first and second nodes over the optimized route.

50. The at least one integrated circuit of claim 46, wherein the second proxy agent comprises a network routing agent.

51. A method for traffic routing between first and second nodes in a communication network, the method comprising:
  receiving a request for a route optimization between the first and second nodes from a first proxy agent associated with the first node;
  transmitting the request to a second proxy agent associated with the second node, wherein the second proxy agent is separate from the first proxy agent;
  receiving a first response to the request from the second proxy agent; and
  transmitting a second response to the first proxy agent based on the first response.

52. The method of claim 51, further comprising authorizing an optimized route between the first and second nodes through the first and second proxy agents.

53. The method of claim 51, further comprising generating the second response to be identical to the first response.

54. The method of claim 51, wherein the proxy agent associated with the second node is a network routing agent (NRA).

55. A method for traffic routing between first and second nodes in a communication network, the method comprising:
  detecting traffic transmitted between the first and second nodes;
  transmitting a first request to a first proxy agent associated with the first node for a route optimization between the first and second nodes;
  receiving a first response from the first proxy agent in response to the first request;
  transmitting a second request to a second proxy agent associated with the second node for the route optimization between the first and second nodes, wherein the second proxy agent is separate from the first proxy agent; and
  receiving a second response from the second proxy agent in response to the second request.

56. The method of claim 55, further comprising authorizing an optimized route between the first and second nodes through the first and second proxy agents.

57. The method of claim 55, wherein the second proxy agent is a network routing agent (NRA).

58. The method of claim 55, wherein said transmitting the first request comprises generating the first request to comprise an identifier of the second proxy agent, and wherein said transmitting the second request comprises generating the second request to comprise an identifier of the first proxy agent.

* * * * *